United States Patent
Huang

(10) Patent No.: US 6,557,407 B1
(45) Date of Patent: May 6, 2003

(54) TIRE PRESSURE GAUGE WITH LIGHTING MEANS

(76) Inventor: Tien-Tsai Huang, No. 4-2, Lane 30, Wu Chuan St., Pan Chiao City, Taipei (TW)

(*) Notice: Subject to any disclaimer, the term of this patent is extended or adjusted under 35 U.S.C. 154(b) by 0 days.

(21) Appl. No.: 10/022,197

(22) Filed: Dec. 20, 2001

(51) Int. Cl.$^7$ .............................................. B60C 23/02
(52) U.S. Cl. ...................... 73/146.8; 73/146; 116/34 R; 340/442
(58) Field of Search ................................ 73/146.8, 146, 73/146.2, 146.3, 146.4; 340/58, 442; 116/34 R, 266–275, 290

(56) References Cited

U.S. PATENT DOCUMENTS

| | | | | |
|---|---|---|---|---|
| 4,574,267 A | * | 3/1986 | Jones | 116/34 R |
| 5,435,173 A | * | 7/1995 | Hwang | 73/146.8 |
| 5,450,298 A | * | 9/1995 | Fells et al. | 362/139 |
| 6,055,854 A | * | 5/2000 | Chen | 116/34 R |
| 6,125,964 A | * | 10/2000 | Tsai | 181/152 |

* cited by examiner

*Primary Examiner*—Hezron Williams
*Assistant Examiner*—Alandra N. Ellington
(74) *Attorney, Agent, or Firm*—Bacon & Thomas, PLLC

(57) ABSTRACT

A tire pressure gauge with a light device. The device includes a cylindrical casing, a light penetrable scale mounted in the casing, a spring device mounted in the casing for biasing the scale in the casing, a piston movable in the casing, and a battery and lamp assembly which may be detachably fastened to one end of the scale outside the casing or provided inside the casing. The device further includes an air nozzle fixedly fastened to one end of the casing and adapted for being, engaged with the air valve of a vehicle tire to guide air from the vehicle tire into the casing to move the piston, causing the piston to force the scale out of the casing to an extent indicative of the pressure of the vehicle tire.

16 Claims, 10 Drawing Sheets

TIRE PRESSURE GAUGE WITH LIGHTING MEANS

BACKGROUND OF THE INVENTION

1. Field of the Invention

The present invention relates to a tire pressure gauge and, more particularly, to a tire pressure gauge having lighting means for use in a dark place.

2. Description of Related Art

A conventional tire pressure gauge has an air nozzle adapted for fastening to the air valve of a vehicle tire. When fastened to the air valve of a vehicle tire, the stopper pin of the air nozzle is opened enabling pressurized air to pass from the vehicle tire into the casing of the tire pressure gauge to move a piston in the casing against a compression spring, thereby causing the piston to move a scale out of the casing to at as an indicator of the air pressure of the vehicle tire. The graduations of the scale cannot be clearly seen when a user measures the vehicle tire pressure in a dark place or the place where no sufficient illumination is provided.

Therefore, it is desirable to provide a tire pressure gauge that is accompanied with a lighting means.

SUMMARY OF THE INVENTION

It is the main object of the present invention to provide a tire pressure gauge, which has lighting means for illumination so that the user can use the tire pressure gauge to measure the tire pressure of the vehicle tires in a dark place. It is another object of the present invention to provide a tire pressure gauge having lighting means, which enables the user to detach the lighting means from the tire pressure gauge for use as hand-held lighting.

To achieve these and other objects of the present invention, the tire pressure gauge comprises a cylindrical casing, a light penetrable scale mounted in the casing, spring means mounted and supporting the scale in the casing, a piston moved in the casing, a battery and lamp assembly, and an air nozzle fixedly fastened to one end of the casing and adapted for fastening to the air valve of a vehicle tire to guide air pressure from the vehicle tire into the casing to move the piston, causing the piston to move the scale out of the casing to act as an indicator of the pressure of the vehicle tire. The battery and lamp assembly may be detachably fastened to one end of the scale outside the casing, or be provided inside the casing. Preferably, the battery and lamp assembly uses a light emitting diode as light source means.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
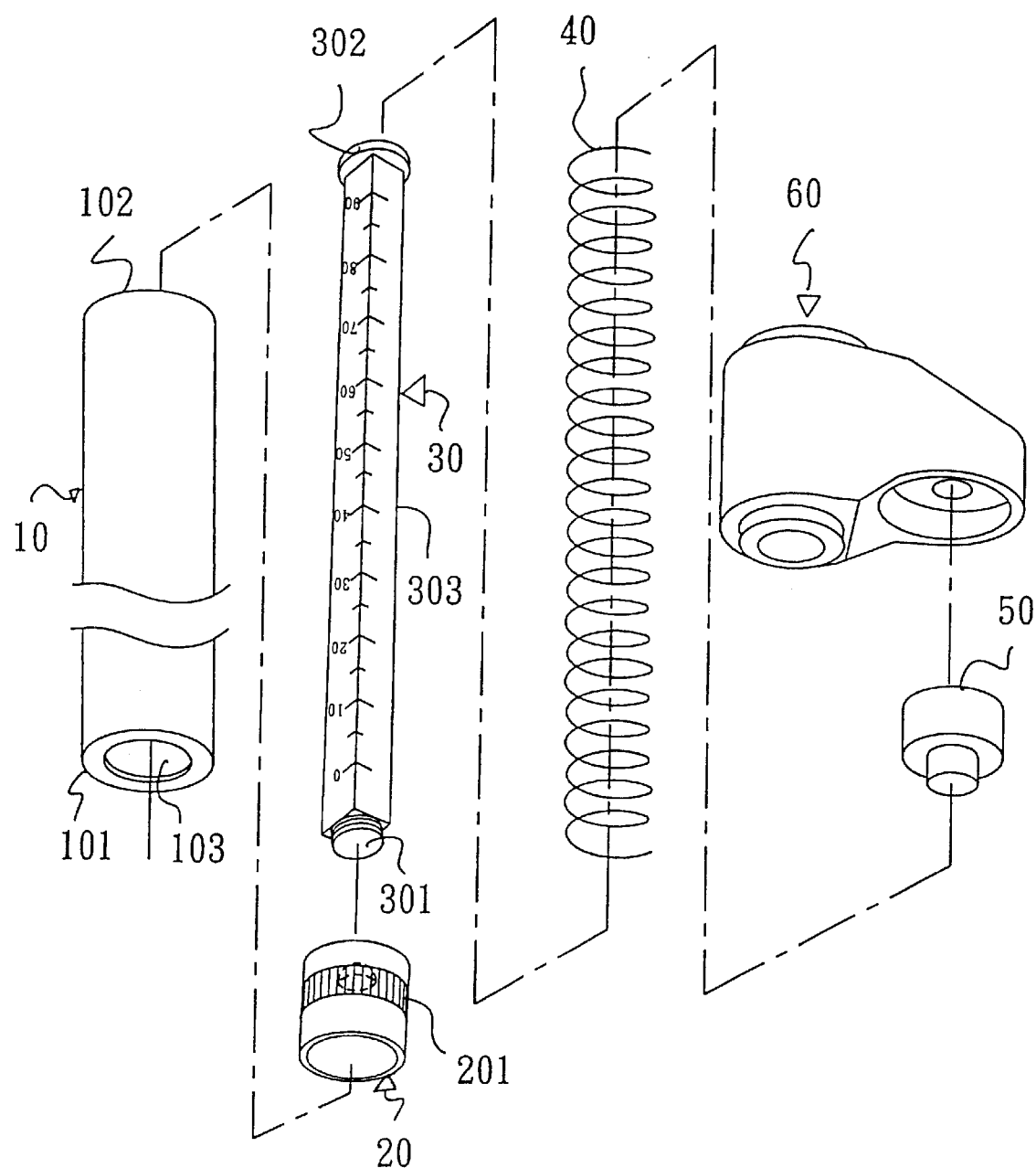
FIG. 1 is an exploded view of a tire pressure gauge according to a first embodiment of the present invention.
Figure 11:
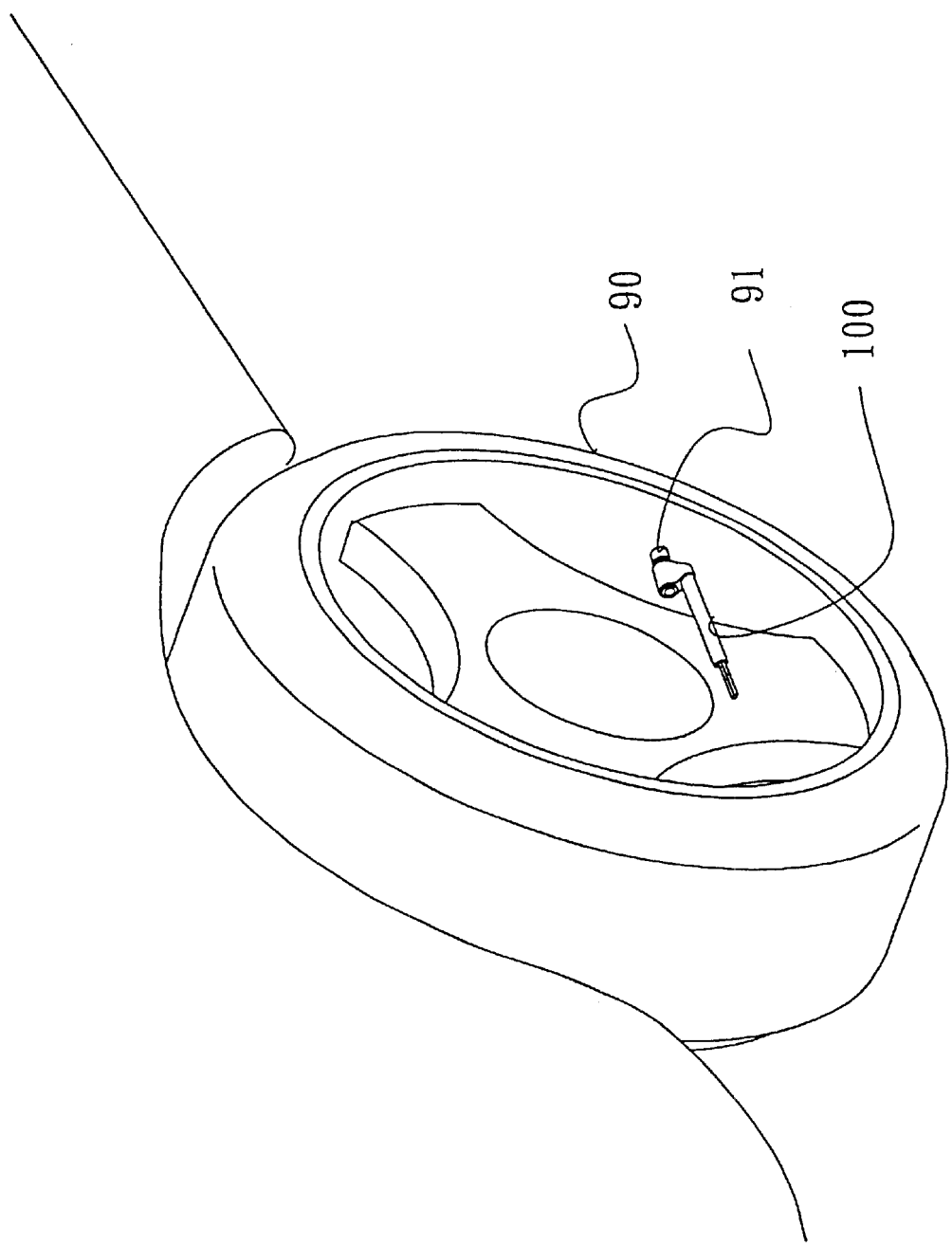
FIG. 11 illustrates the tire pressure gauge installed in the air valve of a vehicle tire according to the present invention.

With reference to FIG. 1, a tire pressure gauge 100 (see also FIG. 11) in accordance with a first embodiment of the present invention comprises a cylindrical casing 10, a battery and lamp assembly 20, a scale 30, a compression spring 40, a piston 50, and an air nozzle 60. The casing 10 has a first end hole 101, a second end hole 102, and a receiving chamber 103 in communication between the first end hole 101 and the second end hole 102. The scale 30 admits light, having a first end 301, a second end 302, and a rod-like scale body 303 connected between the first end 301 and the second end 302. According to this embodiment, the first end 301 is a screw rod. The compression spring 40 accommodates the scale 30 and, together with the scale 30, are mounted in the receiving chamber 103 inside the casing 10, having one end fastened to the first end hole 101 of the casing 10 and the other end fastened to the second end 302 of the scale 30. The battery and lamp assembly 20 is detachably threaded onto the first end 301 of the scale 30, having a rotary switch 201 for on/off control. When switching the rotary switch 201 to the "on" position, the battery and lamp assembly 20 is turned on to emit light through the scale 30. The piston 50 is axially slidably mounted in the receiving chamber 103 of the casing 10 and is supported on the second end 302 of the scale 30. The air nozzle 60 is fastened to the second end hole 102 of the casing 10, and can be engaged with the air valve 91 of a vehicle tire 90 to guide air from the vehicle tire 90 to the inside of the tire pressure gauge 100 (see also FIG. 1).

Figure 2:
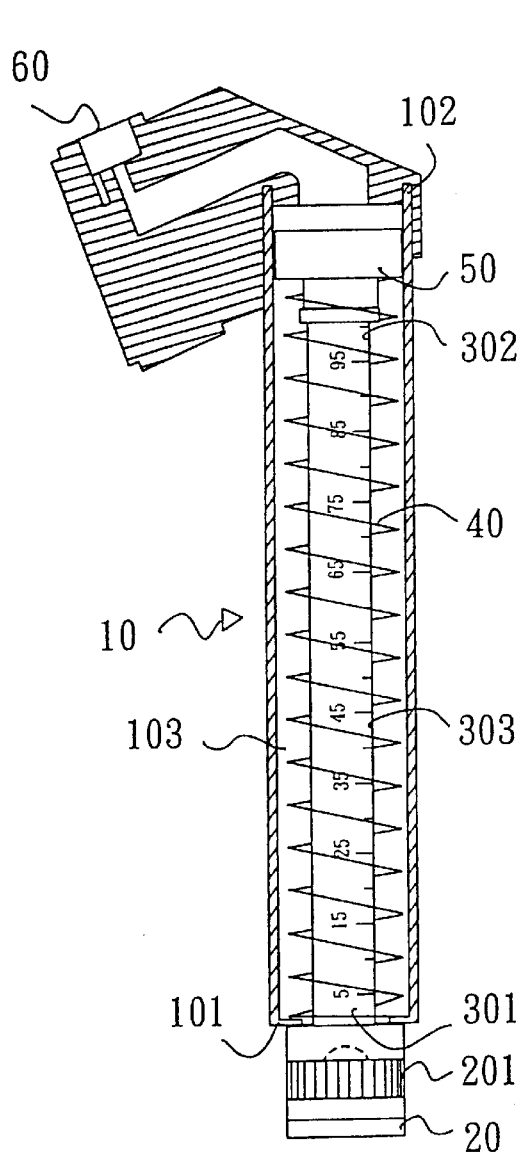
FIG. 2 is a sectional assembly view of the tire pressure gauge according to the first embodiment of the present invention.
Figure 3:
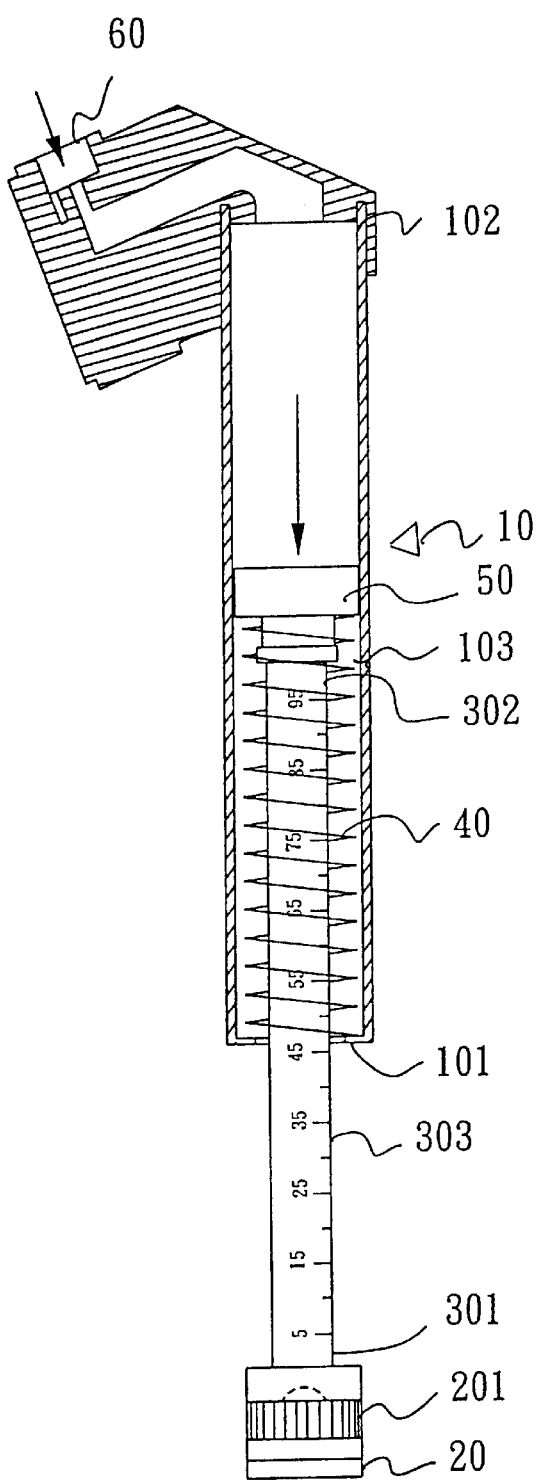
FIG. 3 is a schematic view of the first embodiment of the present invention, showing that air is guided into the casing, and that the scale extends out of the first end hole of the casing.

FIGS. 2 and 3 show the action of the tire pressure gauge according to the first embodiment of the present invention. When in a stand-by position as shown in FIG. 2, the scale 30 is received inside the casing 10 and kept from sight. When rotating the rotary switch 201 to switch on the battery and lamp assembly 20, light passes the battery and lamp assembly 20 through the scale 30. After installation of the air nozzle 60 in the air valve 91 of the vehicle tire 90, the air of the vehicle tire is guided through the air nozzle 60 into the casing 10 to push the piston 50 and overcome the bias of the compression spring 40, as shown in FIG. 3, thereby causing the scale 30 to extend out of the first end hole 101 of the casing 10 to an extent indicative of the pressure of the air inside the vehicle tire.

Figure 4:
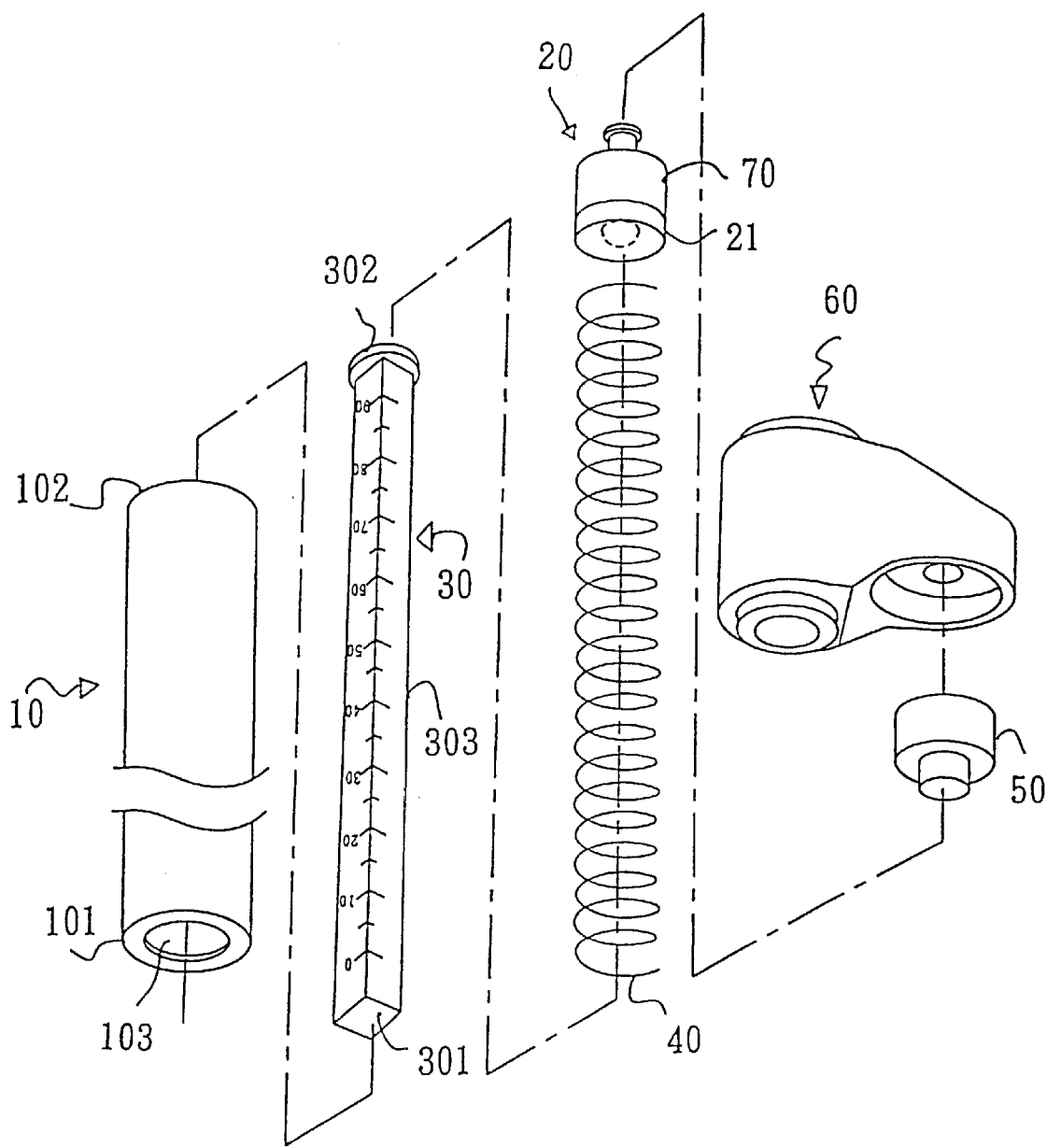
FIG. 4 is an exploded view of a tire pressure gauge according to a second embodiment of the present invention.

FIG. 4 shows a tire pressure gauge according to a second embodiment of the present invention. According to this embodiment, the tire pressure gauge comprises a cylindrical casing 10, a battery and lamp assembly 20, a scale 30, a compression spring 40, a piston 50, and an air nozzle 60. The casing 10 has a first end hole 101, a second end hole 102, and a receiving chamber 103 in communication between the first end hole 101 and the second end hole 102. The scale 30 admits light, having a first end 301, a second end 302, and a rod-like scale body 303 connected between the first end 301 and the second end 302. The compression spring 40 accommodates the scale 30 and, together with the scale 30, are mounted in the receiving chamber 103 inside the casing 10. The battery and lamp assembly 20 is fastened to the second end 302 of the scale 30, having a touch control switch 70 for on/off control. According to this embodiment, the battery and lamp assembly 20 uses an LED (light emitting diode) as light source. The piston 50 is axially slidably mounted in the receiving chamber 103 of the casing 10 and is supported on one end of the compression spring 40. The compression spring 40 is fastened to the first end hole 101 of the casing 10. The air nozzle 60 is fastened to the second end hole 102 of the casing 10, and can be engaged with the air valve 91 of a vehicle tire 90 to guide air from the vehicle tire 90 to the inside of the tire pressure gauge 100 (see also FIG. 11).

Figure 5:
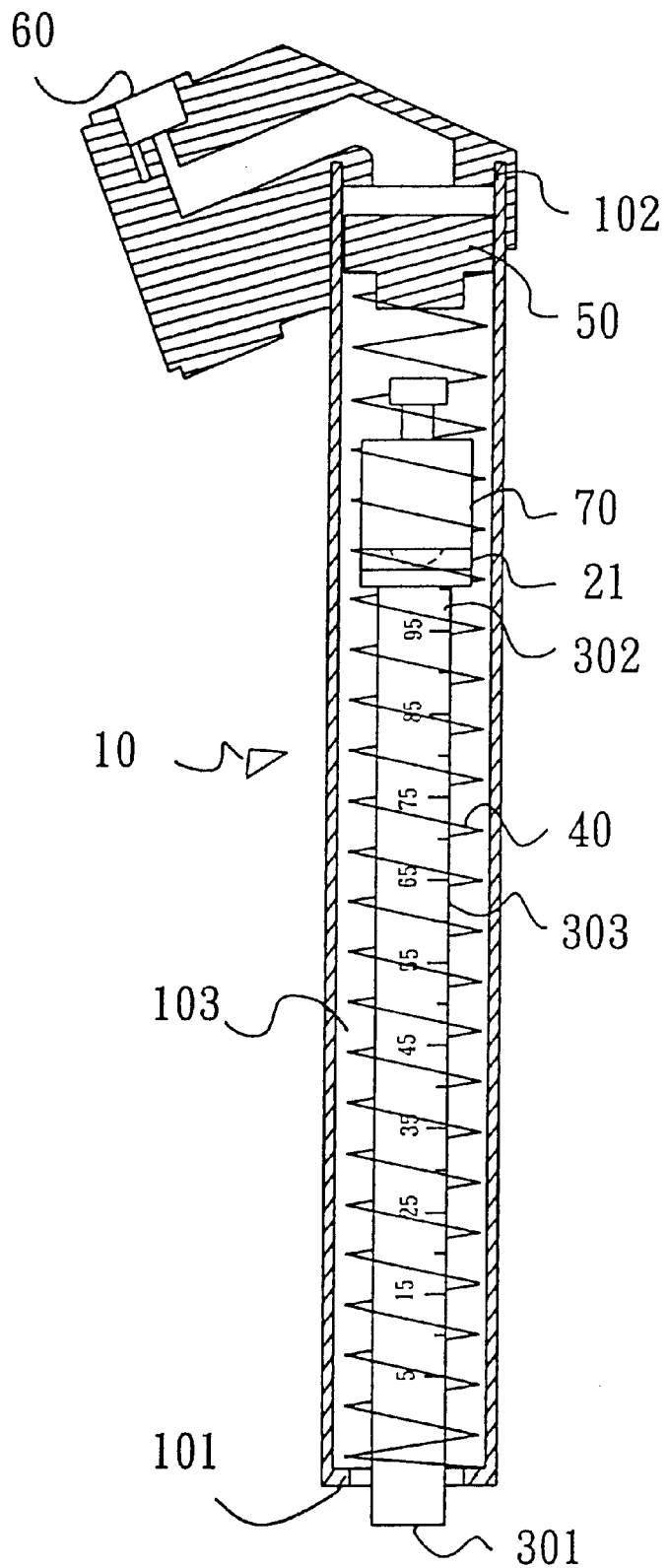
FIG. 5 is a sectional assembly view of the tire pressure gauge according to the second embodiment of the present invention.
Figure 6:
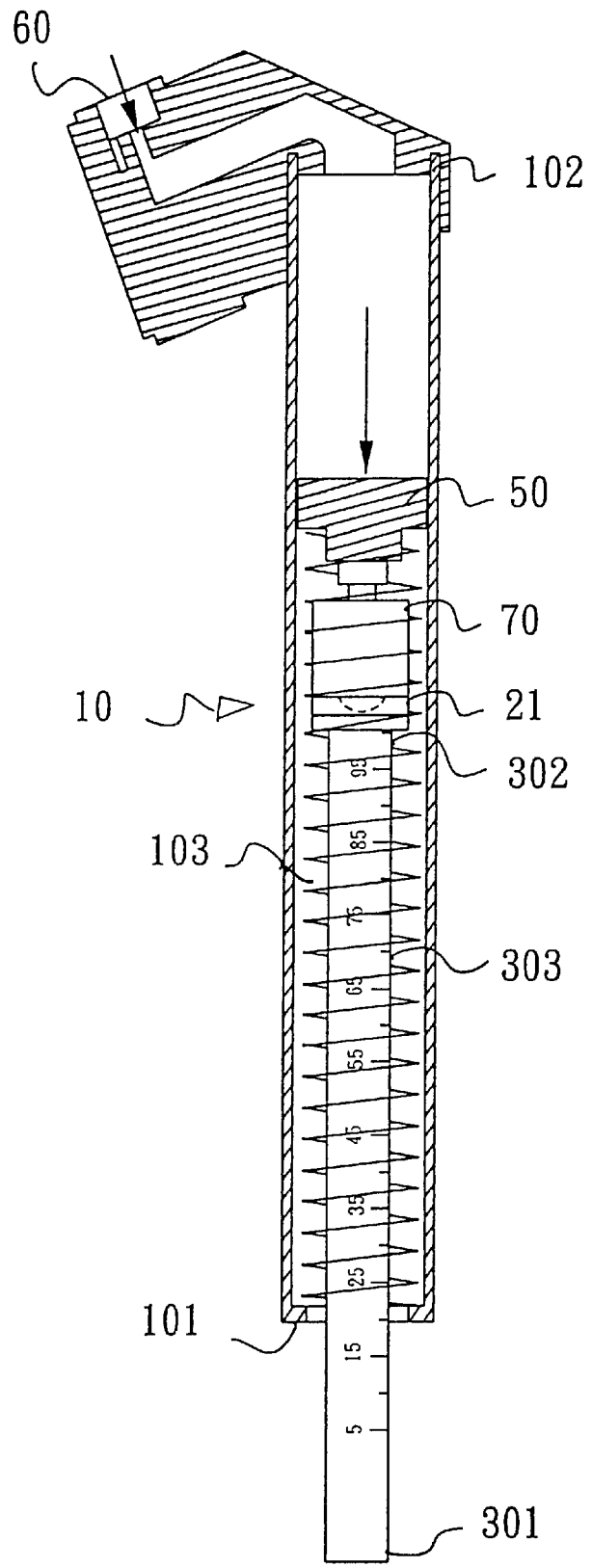
FIG. 6 is a schematic view of the second embodiment of the present invention, showing that air is guided into the casing, and that the scale extends out of the first end hole of the casing.

FIGS. 5 and 6 show the action of the tire pressure gauge according to the second embodiment of the present invention. When in a stand-by position as shown in FIG. 5, the scale 30 is received inside the casing 10 and kept from sight. After installation of the air nozzle 60 in the air valve 91 of the vehicle tire 90, the air of the vehicle tire is guided through the air nozzle 60 into the casing 10 to push the piston 50 and overcome the bias of the compression spring 40, as shown in FIG. 6, thereby causing the piston 50 to switch on the touch control switch 70 of the battery and lamp assembly 20 and to move the scale 30 out of the first end hole 101 of the casing 10 to an extent indicative of the pressure of the air inside the vehicle tire. After measurement, the tire pressure gauge is disconnected from the air valve 91 of the vehicle tire 90. After removal of the tire pressure gauge from the air valve 91 of the vehicle tire 90, the scale 30 is pushed back to the inside of the casing 10, and the touch control switch 70 is triggered by the piston 50 to switch off the battery and lamp assembly 20.

Figure 7:
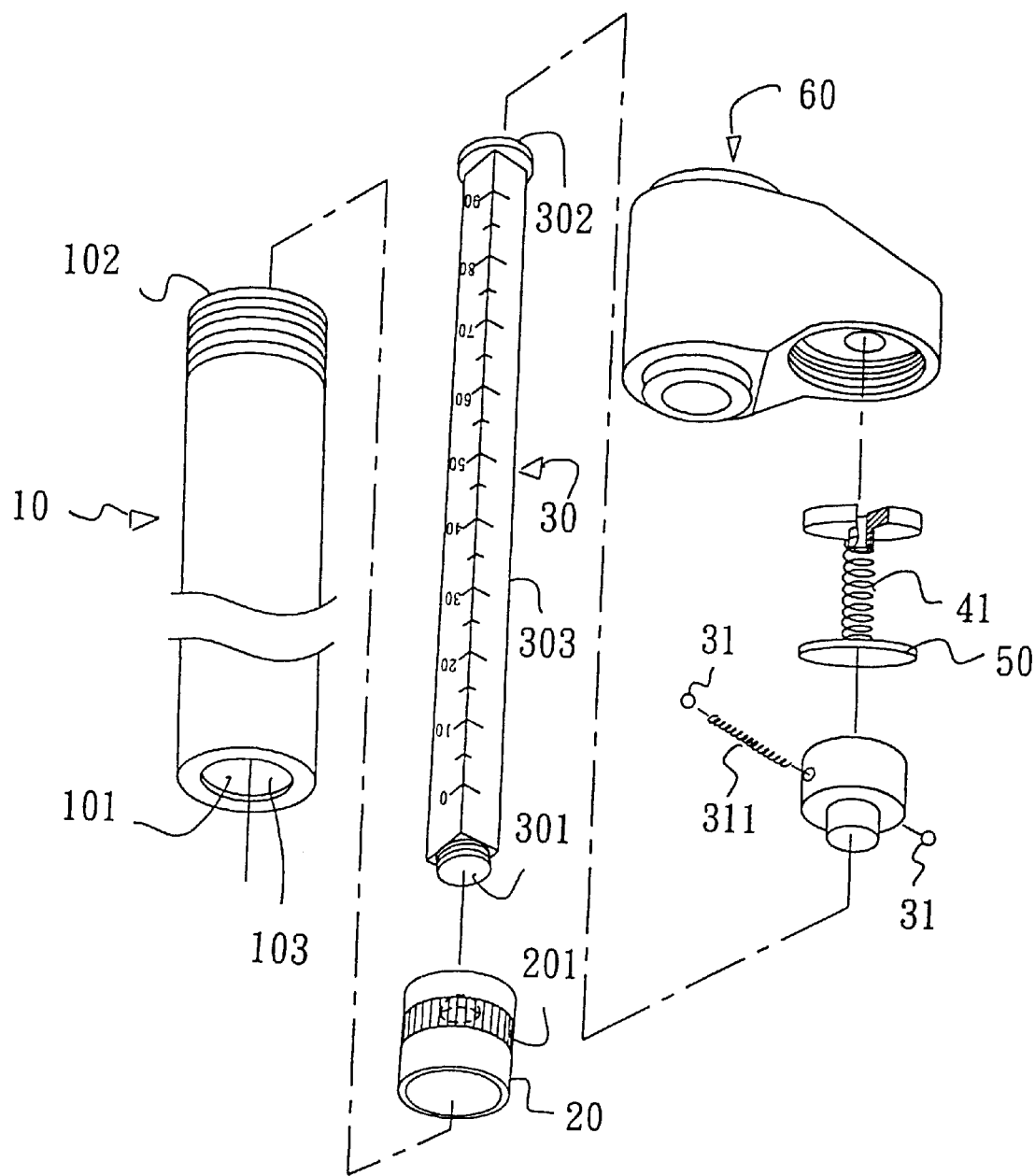
FIG. 7 is an exploded view of a tire pressure gauge according to a third embodiment of the present invention.
Figure 8:
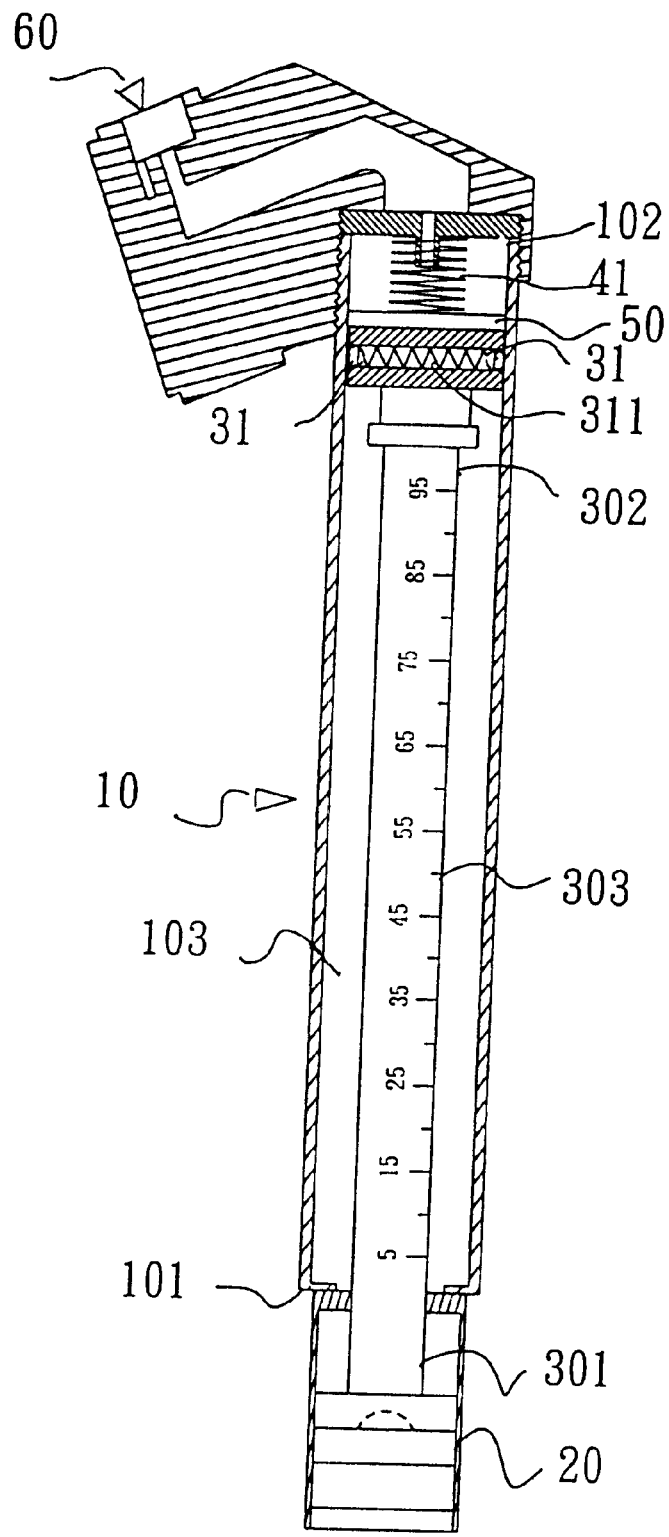
FIG. 8 is a sectional assembly view of the tire pressure gauge according to the third embodiment of the present invention.

FIGS. 7 and 8 show a tire pressure gauge in accordance with a third embodiment of the present invention. According to this embodiment, the tire pressure gauge is comprised of a casing 10, a battery and lamp assembly 20, a scale 30, two steel balls 31, a small spring 31, a tensile spring 41, a piston 50, and an air nozzle 60. The casing 10 has a first end hole 101, a second end hole 102, and a receiving chamber 103 in communication between the first end hole 101 and the second end hole 102. The scale 30 admits light, having a first end 301, a second end 302, and a rod-like scale body 303 connected between the first end 301 and the second end 302. According to this embodiment, the first end 301 is a screw rod. The battery and lamp assembly 20 is detachably threaded onto the first end 301 of the scale 30, having a rotary switch 201 for on/off control. When switching the rotary switch 201 to the "on" position, the battery and lamp assembly 20 is turned on to emit light through the scale 30. The steel balls 31 are respectively supported on the ends of the small spring 311 at the second end 302 of the scale 30 and disposed in contact with the inside wall of the casing 10 to effect a stable movement of the scale 30 in the casing 10. The piston 50 is axially slidably mounted in the receiving chamber 103 of the casing 10 and stopped at the second end 302 of the scale 30 (according to this embodiment, the small spring 311 is installed in an end cap fastened to the second end 302 of the scale 30). The tensile spring 41 is connected between the rear of the piston 50 and a part inside the air nozzle 60. The air nozzle 60 is fastened to the second end hole 102 of the casing 10, and can be installed in the air valve 91 of a vehicle tire 90 to guide air from the vehicle tire 90 to the tire pressure gauge 100 (see also FIG. 11). When rotating the rotary switch 201 to switch on the battery and lamp assembly 20, light passes the battery and lamp assembly 20 through the scale 30. After installation of the air nozzle 60 in the air valve 91 of the vehicle tire 90, the air of the vehicle tire 90 is guided through the air nozzle 60 into the casing 10 to push the piston 50 forwards, thereby causing the tensile spring 41 to stretch and the scale 30 to extend out of the first end hole 101 of the casing 10 to an extent indicative of the pressure of the air inside the vehicle tire.

Figure 9:
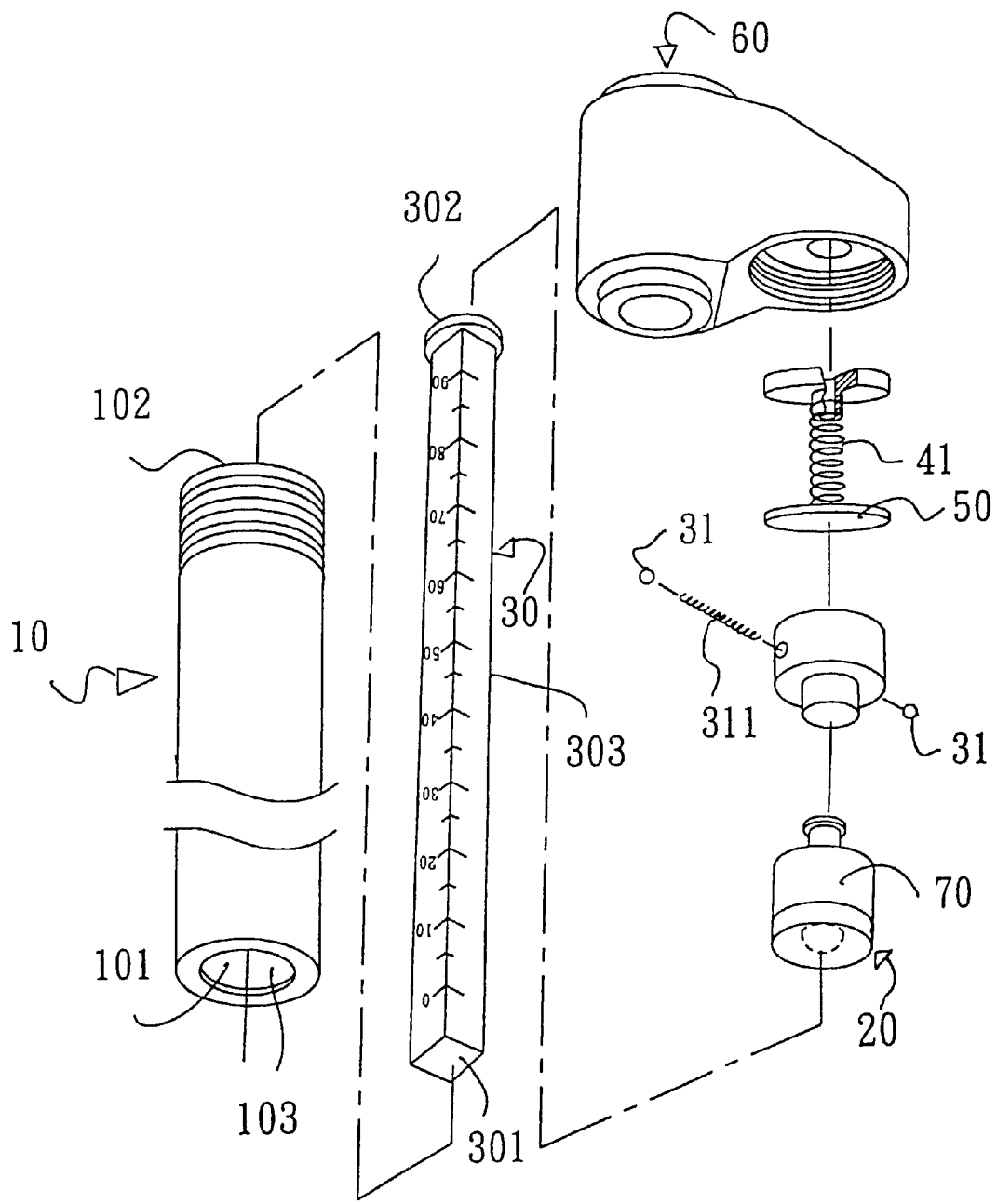
FIG. 9 is an exploded view of a tire pressure gauge according to a fourth embodiment of the present invention.
Figure 10:
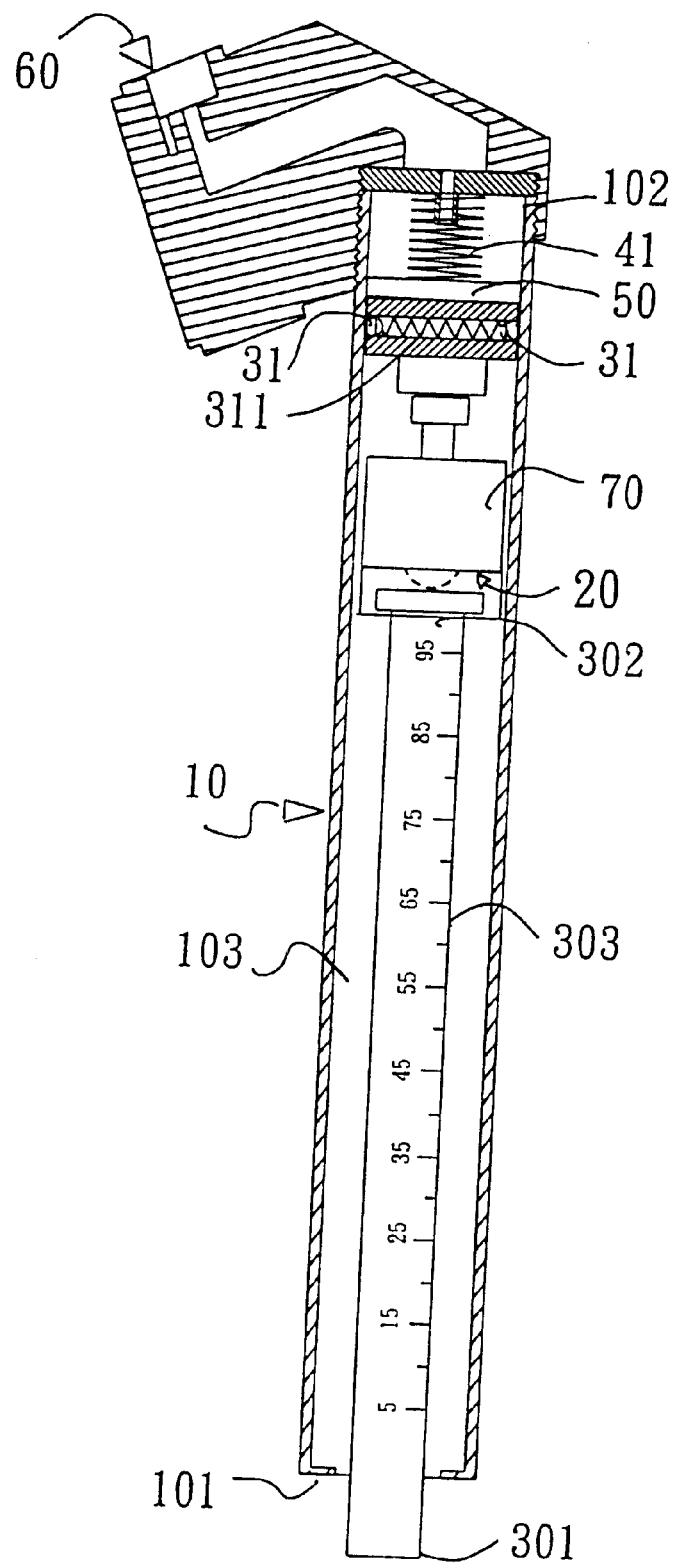
FIG. 10 is a sectional assembly view of the tire pressure gauge according to the fourth embodiment of the present invention.

FIGS. 9 and 10 show a tire pressure gauge in accordance with a fourth embodiment of the present invention. According to this embodiment, the tire pressure gauge is comprised of a casing 10, a battery and lamp assembly 20, a scale 30, two steel balls 31, a small spring 31, a tensile spring 41, a piston 50, and an air nozzle 60. The casing 10 has a first end hole 101, a second end hole 102, and a receiving chamber 103 in communication between the first end hole 101 and the second end hole 102. The scale 30 admits light, having a first end 301, a second end 302, and a rod-like scale body 303 connected between the first end 301 and the second end 302. According to this embodiment, the first end 301 is a screw rod. The battery and lamp assembly 20 is fastened to the second end 302 of the scale 30, having a touch control switch 70 for on/off control. According to this embodiment, the battery and lamp assembly 21 uses an LED (light emitting diode) as light source. The steel balls 31 are respectively supported on the ends of the small spring 311 and disposed in contact with the inside wall of the casing 10. The piston 50 is axially slidably mounted in the receiving chamber 103 of the casing 10. The tensile spring 41 is connected between the rear of the piston 50 and a part inside the air nozzle 60. The air nozzle 60 is fastened to the second end hole 102 of the casing 10, and can be installed in the air valve 91 of a vehicle tire 90 to guide air from the vehicle tire 91 to the inside of the tire pressure gauge 100 (see also FIG. 11). After installation of the air nozzle 60 in the air valve 91 of the vehicle tire 90, the air of the vehicle tire is guided through the air nozzle 60 into the inside of the casing 10 to push the piston 50 forwards, thereby causing the piston 50 to switch on the touch control switch 70 of the battery and lamp assembly 20, the tensile spring 41 to stretch, and the scale 30 to extend out of the first end hole 101 of the casing 10 to an extent indicative of the pressure of the air inside the vehicle tire 90. After removal of the tire pressure gauge from the air valve 91 of the vehicle tire 90, the scale 30 is pushed back to the inside of the casing 10, and the touch control switch 70 is effected by the bottom edge of the piston 50 to switch off the battery and lamp assembly 20.

Although particular embodiments of the invention have been described in detail for the purpose of illustration, various modifications and improvement may be made without departing from the scope of the invention. Accordingly, the invention is not to be limited except as by the appended claims.

What is claimed is:
1. A tire pressure gauge comprising:
   a casing, comprising a first end hole, a second end hole, and a receiving chamber in communication between said first end hole and said second end hole;
   a light penetrable scale mounted in the receiving chamber of said casing and moved in and out of the first end hole of said casing, said light penetrable scale having a first end moved in and out of the first end hole of said casing, a second end, and an elongated scale body connected between said first end and said second end;

a battery and lamp assembly fastened to the first end of said light penetrable scale outside said casing;

a compression spring mounted in the receiving chamber of said casing and accommodating said light penetrable scale;

a piston moved in the receiving chamber of said casing between the first end hole and second end hole and fastened to one end of said compression spring and stopped at the second end of said light penetrable scale; and an air nozzle fixedly fastened to the second end hole of said casing and adapted for being engaged with an air valve of a vehicle tire for guiding air pressure from a vehicle tire into said casing so as to move said piston and to force said light penetrable scale out of the first end hole of said casing.

2. The tire pressure gauge as claimed in claim 1, wherein said battery and lamp assembly uses a light emitting diode to emit light.

3. The tire pressure gauge as claimed in claim 1, wherein said battery and lamp assembly is detachably fastened to the first end of said light penetrable scale by a screw joint.

4. The tire pressure gauge as claimed in claim 1, wherein said light penetrable scale is made from material that can emit light.

5. A tire pressure gauge comprising:

a casing, comprising a first end hole, a second end hole, and a receiving chamber in communication between said first end hole and said second end hole;

a light penetrable scale mounted in the receiving chamber of said casing and moved in and out of the first end hole of said casing, said light penetrable scale having a first end moved in and out of the first end hole of said casing, a second end, and an elongated scale body connected between said first end and said second end;

a compression spring mounted in the receiving chamber of said casing and accommodating said light penetrable scale;

a battery and lamp assembly supported on the second end of said light penetrable scale in the receiving chamber of said casing;

a touch control switch connected to said battery and lamp assembly and adapted for switching on/off said battery and lamp assembly;

a piston moved in the receiving chamber of said casing between the first end hole and second end hole and stopped at said touch control switch; and an air nozzle fixedly fastened to the second end hole of said casing and adapted for being engaged with an air valve of a vehicle tire for guiding air from a vehicle tire into said casing to move said piston against said compression spring and to force said piston to switch on said touch control switch and to force said light penetrable scale out of the first end hole of said casing.

6. The tire pressure gauge as claimed in claim 5, wherein said battery and lamp assembly uses a light emitting diode to emit light.

7. The tire pressure gauge as claimed in claim 5, wherein said light penetrable scale is made from material can emit light.

8. A tire pressure gauge comprising:

a casing, comprising a first end hole, a second end hole, and a receiving chamber in communication between said first end hole and said second end hole;

a light penetrable scale mounted in the receiving chamber of said casing and moved in and out of the first end hole of said casing, said light penetrable scale having a first end moved in and out of the first end hole of said casing, a second end, and an elongated scale body connected between said first end and said second end;

a battery and lamp assembly fastened to the first end of said light penetrable scale outside said casing;

a tensile spring mounted in the receiving chamber of said casing;

a piston moved in the receiving chamber of said casing between the first end hole and second end hole and connected to one end of said tensile spring and stopped at the second end of said light penetrable scale; and an air nozzle fixedly fastened to the second end hole of said casing and adapted for being engaged with an air valve of a vehicle tire for guiding air from a vehicle tire into said casing to move said piston and to force said light penetrable scale out of the first end hole of said casing.

9. The tire pressure gauge as claimed in claim 8 further comprising a plurality of steel balls supported on a spring device in the second end of said light penetrable scale and disposed in contact with the wall of the receiving chamber of said casing.

10. The tire pressure gauge as claimed in claim 8, wherein said battery and lamp assembly uses a light emitting diode to emit light.

11. The tire pressure gauge as claimed in claim 8, wherein said battery and lamp assembly is detachably fastened to the first end of said light penetrable scale by a screw joint.

12. The tire pressure gauge as claimed in claim 8, wherein said light penetrable scale is made from material that can emit light.

13. A tire pressure gauge comprising:

a casing, comprising a first end hole, a second end hole, and a receiving chamber in communication between said first end hole and said second end hole;

a light penetrable scale mounted in the receiving chamber of said casing and moved in and out of the first end hole of said casing, said light penetrable scale having a first end moved in and out of the first end hole of said casing, a second end, and an elongated scale body connected between said first end and said second end;

a battery and lamp assembly supported on the second end of said light penetrable scale in the receiving chamber of said casing;

a touch control switch connected to said battery and lamp assembly and adapted for switching on/off said battery and lamp assembly;

a tensile spring mounted in the receiving chamber of said casing;

a piston moved in the receiving chamber of said casing between the first end hole and second end hole of said connected to one end of said tensile spring and stopped at said touch control switch; and an air nozzle fixedly fastened to the second end hole of said casing and adapted for fastening to an air valve of a vehicle tire for guiding air from a vehicle tire into said casing to move said piston to force said light penetrable scale out of the first end hole of said casing.

14. The tire pressure gauge as claimed in claim 13 wherein said battery and lamp assembly uses a light emitting diode to emit light.

15. The tire pressure gauge as claimed in claim 13 further comprising a plurality of steel balls supported on spring means in the second end of said light penetrable scale and disposed in contact with the wall of the receiving chamber of said casing.

16. The tire pressure gauge as claimed in claim 13, wherein said light penetrable scale is made from material that can emit light.

* * * * *